United States Patent
Soman et al.

(10) Patent No.: US 10,879,958 B2
(45) Date of Patent: Dec. 29, 2020

(54) OPTIMIZED PHY FRAME STRUCTURE FOR OFDM BASED NARROWBAND PLC

(71) Applicant: TEXAS INSTRUMENTS INCORPORATED, Dallas, TX (US)

(72) Inventors: Mehul Soman, Dallas, TX (US); Il Han Kim, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/539,368

(22) Filed: Aug. 13, 2019

(65) Prior Publication Data

US 2019/0363754 A1 Nov. 28, 2019

Related U.S. Application Data

(63) Continuation of application No. 15/601,063, filed on May 22, 2017, now Pat. No. 10,425,127, which is a continuation of application No. 14/925,598, filed on Oct. 28, 2015, now Pat. No. 9,692,484.

(60) Provisional application No. 62/133,537, filed on Mar. 16, 2015.

(51) Int. Cl.
| | |
|---|---|
| *H04B 3/54* | (2006.01) |
| *H04L 7/00* | (2006.01) |
| *H04L 27/26* | (2006.01) |
| *H04L 5/00* | (2006.01) |
| *H04L 7/04* | (2006.01) |

(52) U.S. Cl.
CPC ............ *H04B 3/542* (2013.01); *H04L 5/0048* (2013.01); *H04L 7/0079* (2013.01); *H04L 7/041* (2013.01); *H04L 27/26* (2013.01); *H04L 27/2602* (2013.01); *H04L 27/2608* (2013.01); *H04L 27/2613* (2013.01); *H04L 27/2627* (2013.01)

(58) Field of Classification Search
CPC .............. H04L 5/0048; H04L 27/2608; H04L 27/2613; H04L 27/2602; H04L 27/2673; H04L 27/2655; H04L 5/0094
See application file for complete search history.

(56) References Cited

U.S. PATENT DOCUMENTS

| | | | |
|---|---|---|---|
| 8,483,741 B1 | 7/2013 | Hussain et al. | |
| 2003/0228850 A1* | 12/2003 | Hwang | H04B 7/061 455/101 |
| 2004/0066740 A1 | 4/2004 | Suh et al. | |

(Continued)

FOREIGN PATENT DOCUMENTS

| | | |
|---|---|---|
| WO | 2007148584 | 12/2007 |
| WO | 2008011889 | 1/2008 |

(Continued)

OTHER PUBLICATIONS

"IEEE Standard for Low-Frequency (less than 500 kHz) Narrow-band Power Line Communications for Smart Grid Applications," IEEE Communications Society, IEEE Standard 1801.2TM-2013 (269 pages).

*Primary Examiner* — Aristocratis Fotakis
(74) *Attorney, Agent, or Firm* — Brian D. Graham; Charles A. Brill; Frank D. Cimino

(57) ABSTRACT

A method of operating a communication system is disclosed. The method includes forming a data frame having plural orthogonal frequency division multiplex (OFDM) symbols. A first set of preamble subcarriers is allocated to at least one of the OFDM symbols. A second set of data subcarriers is allocated to said at least one of the OFDM symbols.

23 Claims, 7 Drawing Sheets

(56) References Cited

U.S. PATENT DOCUMENTS

| | | | |
|---|---|---|---|
| 2004/0136464 A1 | 7/2004 | Suh et al. | |
| 2005/0180386 A1 | 8/2005 | Hansen et al. | |
| 2006/0018250 A1* | 1/2006 | Gu | H04L 5/0048 |
| | | | 370/208 |
| 2008/0080472 A1* | 4/2008 | Bertrand | H04J 11/005 |
| | | | 370/344 |
| 2008/0240217 A1 | 10/2008 | Lee et al. | |
| 2010/0214985 A1* | 8/2010 | Chun | H04L 27/2602 |
| | | | 370/328 |
| 2010/0272192 A1* | 10/2010 | Varadarajan | H04L 27/2613 |
| | | | 375/257 |
| 2011/0043340 A1* | 2/2011 | Kim | H04B 3/542 |
| | | | 375/260 |
| 2012/0063497 A1* | 3/2012 | Kim | H04B 3/542 |
| | | | 375/222 |
| 2012/0320996 A1 | 12/2012 | Dabak et al. | |
| 2013/0051320 A1* | 2/2013 | Pande | H04B 3/542 |
| | | | 370/328 |
| 2013/0101055 A1 | 4/2013 | Pande et al. | |
| 2014/0056249 A1 | 2/2014 | Park et al. | |
| 2014/0105313 A1 | 4/2014 | Kim et al. | |
| 2014/0269948 A1 | 9/2014 | Downey | |
| 2016/0094373 A1 | 3/2016 | Ibrahim et al. | |

FOREIGN PATENT DOCUMENTS

| | | |
|---|---|---|
| WO | 2009036216 | 3/2009 |
| WO | 2009151155 | 12/2009 |

* cited by examiner

US 10,879,958 B2

OPTIMIZED PHY FRAME STRUCTURE FOR OFDM BASED NARROWBAND PLC

CROSS-REFERENCE TO RELATED APPLICATION(S)

This application is a continuation of U.S. patent application Ser. No. 15/601,063, filed May 22, 2017, which is a continuation of U.S. patent application Ser. No. 14/925,598, filed Oct. 28, 2015, now U.S. Pat. No. 9,692,484, which claims priority to and the benefit of Provisional Application No. 62/133,537, filed Mar. 16, 2015, each of which is incorporated herein by reference in its entirety.

BACKGROUND OF THE INVENTION

Embodiments of the present invention relate to power line communication (PLC) and, more particularly, to an optimized narrowband orthogonal frequency division multiplex (OFDM) based physical (PHY) frame structure.

Powerline communications (PLC) include systems for communicating data over the same medium that is used to transmit electric power to residences, buildings, and other premises. Once deployed, PLC systems may enable a wide array of applications, including, for example, automatic meter reading and load control for utility-type applications, automotive uses such as charging electric cars, home automation for controlling appliances and lights, and computer networking for internet of things (IoT).

Various PLC standardizing efforts are currently being undertaken around the world, each with its own unique characteristics. Examples of competing PLC standards include the IEEE 1901.2, HomePlug AV, and ITU-T G.hn (e.g., G.9960 and G.9961) specifications. Generally speaking, PLC systems may be implemented differently depending upon local regulations and characteristics of local power grids. For example, the U.S. FCC implementation of IEEE 1901.2 uses OFDM subcarriers from 10 kHz to 490 kHz. CENELEC, the European standard, has various implementations using OFDM subcarriers from 3 kHz to 148.5 kHz. ARIB, the Japanese standard, uses OFDM subcarriers from 10 kHz to 450 kHz. Another standardization effort includes, for example, the Powerline-Related Intelligent Metering Evolution (PRIME) standard designed for OFDM-based (Orthogonal Frequency-Division Multiplexing) communications. The current or existing PRIME standard is the Draft Standard prepared by the PRIME Alliance Technical Working Group (PRIME R1.3E) and earlier versions thereof.

Current and next generation narrowband PLC standards are directed to multi-carrier based systems, such as orthogonal frequency division multiplexing (OFDM) in order to get higher network throughput. OFDM uses multiple orthogonal subcarriers to transmit data over frequency selective channels. A conventional OFDM structure for a data frame includes a preamble, followed by a physical layer (PHY) header, a media access control (MAC) header, followed by a data payload. However, PLC channels are highly challenging environments for digital communication because they suffer from periodic bursts of impulse noise, and the channel impulse response also varies over time.

A conventional synchronization preamble structure for a narrowband OFDM PLC standard, such as IEEE 1901.2 (G3), includes 8 SYNCP symbols followed by 1.5 SYNCM symbols. The synchronization symbols are typically transmitted at a higher (3 dB) rms voltage than the data payload, and there is no cyclic prefix between adjacent symbols. Each SYNCP symbol is a known preamble sequence of different subcarriers phase shifted by a multiple of $\pi/8$. Subcarriers of the SYNCM symbol are phase shifted by $\pi$ with respect to SYNCP so that SYNCM=−SYNCP. For example, a SYNCP symbol may be a chirp-like sequence of a specific binary sequence of 1 s and −1 s or a constant amplitude, zero autocorrelation (CAZAC) sequence. The definition of the SYNCP symbol for the FCC band in IEEE P1901.2 is defined in section 6.6 for specific subcarriers or tones.

The preamble serves several purposes including: 1) indicating to other nodes in the PLC network that a transmission is in progress; 2) determining the frame boundary between the preamble and the PHY header, and between the PHY header and the data payload; 3) determining accurate channel estimates; and 4) for frequency offset compensation. SYNCM symbols help determine the frame boundary and indicate the end of the preamble sequence. The repetitive SYNCP symbols also assist in preamble detection as receiver nodes are looking for the repetitive sequence of symbols in the PLC channel to determine whether or not a frame is on the powerline. Multiple SYNCP symbols also help in obtaining more accurate channel estimates by averaging the channel estimates across multiple symbols to reduce noise. Improved channel estimates also help in improving the header decoding performance when the header is coherently modulated with respect to the SYNCP preamble.

While preceding approaches provide improvement and standardization in PLC operation, the present inventors recognize that still further improvements are possible. This is particularly true for high data rate PLC applications. Accordingly, the preferred embodiments described below are directed toward this as well as improving upon the prior art.

BRIEF SUMMARY OF THE INVENTION

In a first embodiment of the present invention, there is disclosed a method of operating a communication system. The method includes forming a data frame having plural orthogonal frequency division multiplex (OFDM) symbols. A first set of preamble subcarriers is allocated to at least one of the OFDM symbols. A second set of data subcarriers is allocated to said at least one of the OFDM symbols.

In a second embodiment of the present invention, there is disclosed a method of operating a communication system. The method includes receiving a data frame having plural orthogonal frequency division multiplex (OFDM) symbols. A first set of preamble signals is received from at least one of the OFDM symbols. A second set of data signals is received from said at least one of the OFDM symbols.

DETAILED DESCRIPTION OF THE INVENTION

Figure 1:
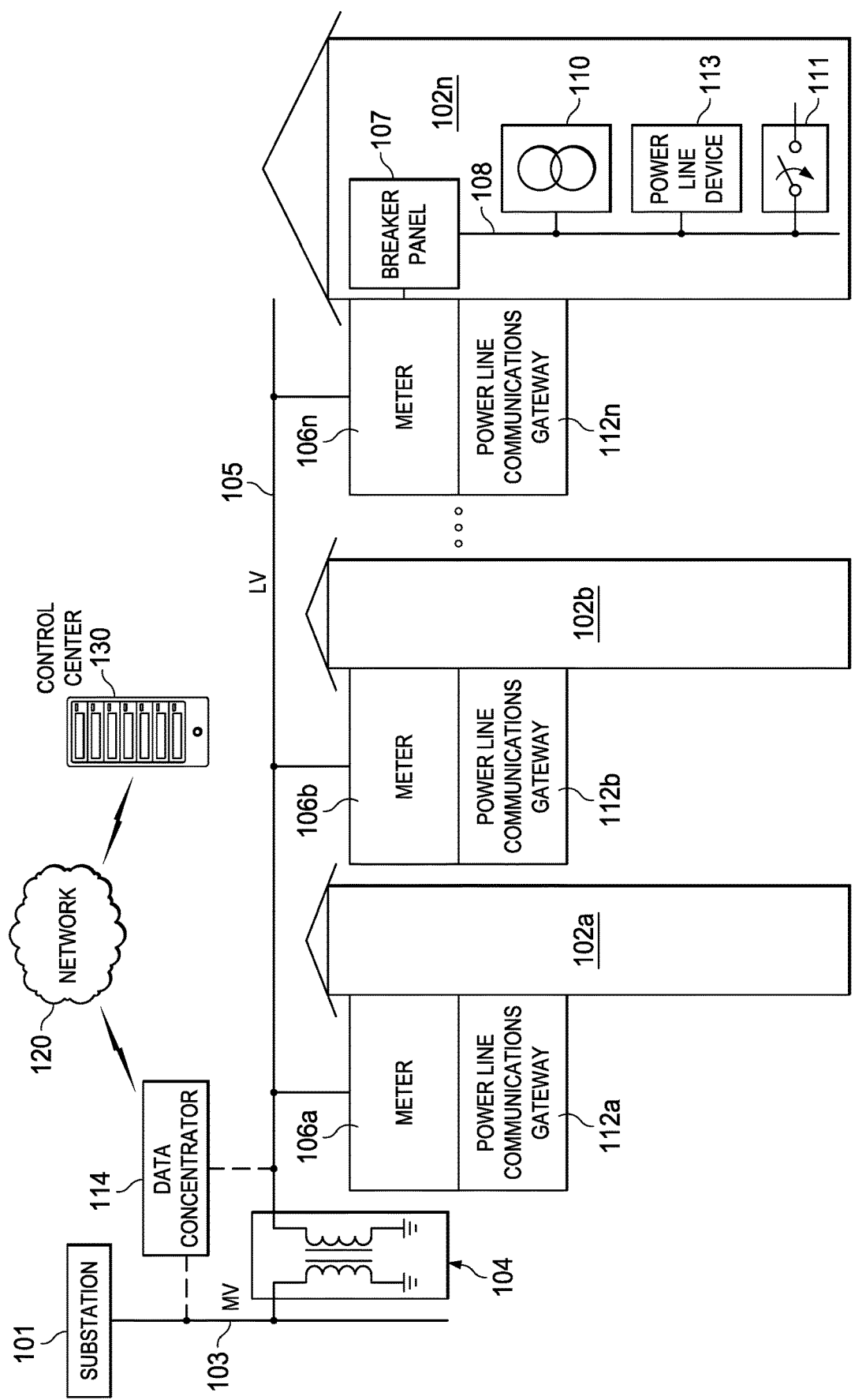
FIG. 1 is a diagram of a power line communication (PLC) environment of the present invention.

Referring to FIG. 1, there is an electric power distribution system is depicted according to the present invention. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 kHz, to pass between LV lines 105 and MV lines 103. LV lines 105 feed power to customers via meters 106a-n, which are typically mounted on the outside of residences 102a-n. Although referred to as residences, premises 102a-n may include any type of building, facility or location where electric power is received and/or consumed. A breaker panel, such as panel 107, provides an interface between meter 106n and electrical wires 108 within residence 102n. Electrical wires 108 deliver power to outlets 110, switches 111, and other electric devices within residence 102n.

The power line topology illustrated in FIG. 1 may be used to deliver high-speed communications to residences 102a-n. In some implementations, power line communication (PLC) modems or gateways 112a-n may be coupled to LV power lines 105 at meter 106a-n. PLC gateways 112a-n may be used to transmit and receive data signals over MV/LV lines 103/105. Such data signals may be used to support metering and power delivery applications, communication systems, high speed internet, telephony, video conferencing, and video delivery, to name a few. By transporting telecommunications data signals over a power transmission network, there is no need to install new cabling to each subscriber 102a-n. Thus, by using existing electrical distribution systems to carry data signals, significant cost savings are possible.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband internet links, narrowband control applications, and low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130, which may be a utility company, via network 120. Network 120 may include, for example, an internet protocol (IP) based network, a cellular network, a WiFi network, a WiMax network, or the like. As such, control center 130 may be configured to collect power consumption information and other types of relevant information from gateways 112 and devices 113 through concentrator 114. Additionally, control center 130 may be configured to implement smart grid policies and other regulatory or commercial rules by communicating such rules to each gateway 112 or device 113 through concentrator 114.

In some embodiments, concentrator 114 may be a base node for a PLC domain, each such domain comprising downstream PLC devices that communicate with control center 130 through a respective concentrator 114. For example, in FIG. 1, devices 106a-n, 112a-n, and 113 may all be considered part of the PLC domain that has data concentrator 114 as its base node. In other scenarios other devices may be used as the base node of a PLC domain. In a typical situation, multiple nodes may be deployed in a given PLC network, and at least a subset of those nodes may be tied to a common clock through a backbone such as Ethernet or digital subscriber loop (DSL).

Still referring to FIG. 1, meter 106, gateways 112, PLC device 113, and data concentrator 114 may each be coupled to or otherwise include a PLC modem or the like. The PLC modem may include transmitter and receiver circuitry to facilitate the device's connection to power lines 103, 105, and/or 108.

Figure 2:
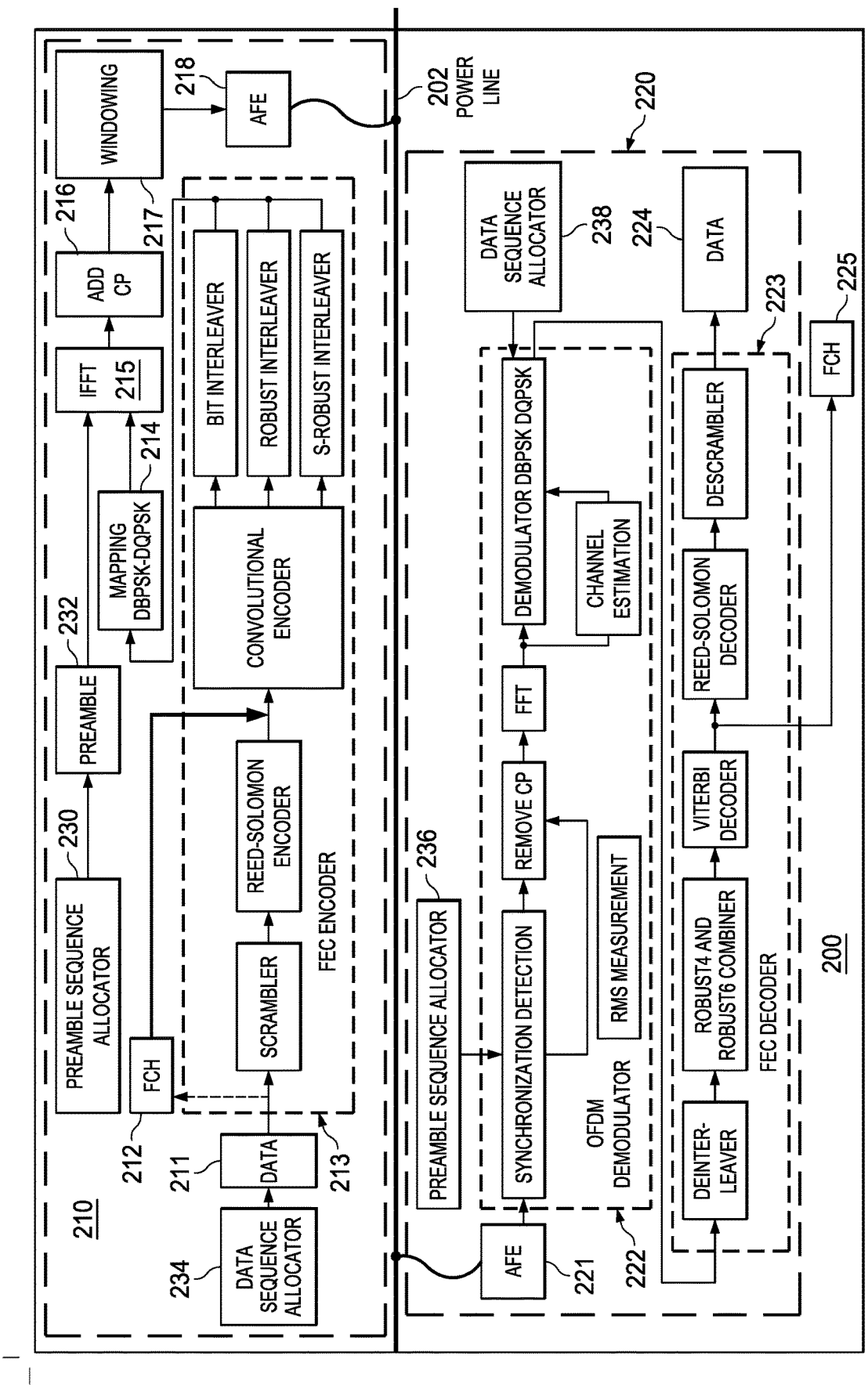
FIG. 2 is a block diagram of an IEEE 1901.2 (G3) compatible device of the present invention.

FIG. 2 is a block diagram of an exemplary low cost, low power IEEE 1901.2 compatible device 200 that may be used in blocks 112a-n (FIG. 1) according to the present invention. The diagram illustrates an OFDM transmitter 210 and receiver 220 for use in a power line communication node for PLC over a power line 202. As discussed above, the power line channel is very hostile. Channel characteristics and parameters vary with frequency, location, time and the type of equipment connected to it. The lower frequency regions from 10 kHz to 200 kHz used in G3 PLC and in IEEE 1901.2 are especially susceptible to interference. Furthermore, the power line is a very frequency selective channel. Besides background noise, it is subject to impulsive noise often occurring at 50/60 Hz, and narrowband interference and group delays up to several hundred microseconds.

Preamble circuit 232 produces a preamble to synchronize each transmitted data frame with a receiving device. Preamble sequence allocator circuit 230 determines which tones in an OFDM symbol will be occupied by the preamble. Data 211 and a frame control header (FCH) 212 are provided by an application via a media access layer (MAC) of the communication protocol. Similar to the preamble sequence allocator circuit 230, data sequence allocator circuit 234 determines which tones in an OFDM symbol will be used by data circuit 211 or FCH circuit 212. An OFDM signal is generated by performing an inverse fast Fourier transform (IFFT) 215 on the complex valued signal points that are produced by differentially encoded phase modulation from forward error correction encoder 213 using Reed Solomon encoding. Tone mapping 214 is performed to allocate the signal points to individual subcarriers. An OFDM symbol is built by appending a cyclic prefix (CP) 216 to the beginning of each block generated by IFFT 215. The length of a cyclic prefix is chosen so that a channel group delay will not cause successive OFDM Symbols or adjacent sub-carriers to interfere. The OFDM symbols are then windowed 217 and impressed on power line 202 via analog front end (AFE) 218. AFE 218 provides isolation of transmitter 210 from the 50/60 Hz power line voltage.

Similarly, receiver 220 receives OFDM signals from power line 202 via AFE 221 that isolates receiver 220 from the 50/60 HZ power line voltage. OFDM demodulator 222 removes the CP, converts the OFDM signal to the frequency domain using a fast Fourier transform (FFT), and performs demodulation of the differential binary or quadrature phase shift keyed (DBPSK, DQPSK) symbols. FEC decoder 223 performs error correction using Reed Solomon decoding and then descrambles the symbols to produce received data 224. Frame control header 225 information is also produced by FEC decoder 220, as defined by the G3 and IEEE 1901.2 PLC standards. Similar to the transmitter 210, receiver 220 also has a preamble sequence allocator circuit 236 and data sequence allocator circuit 238 to indicate which tones are used for the preamble and which tones are used for data in any OFDM symbol.

A blind channel estimation technique may be used for link adaptation. Based on the quality of the received signal, the receiver decides on the modulation scheme to be used, as defined in the PLC standards. Moreover, the system may differentiate the subcarriers with a bad signal to noise ratio (SNR) and not transmit data on them.

Transmitter 210 and receiver 220 may be implemented using a digital signal processor (DSP) or another type of microprocessor that executes control software instructions stored in memory. For example, the processor may perform operations such as FEC encoding, mapping and OFDM modulation, demodulation and FEC decoding in software. In other embodiments, portions or all of the transmitter or receiver may be implemented with hardwired control logic. The analog front ends 218 and 221 require analog logic and isolation transformers that can withstand the voltage levels present on the power line.

A G3 and IEEE 1901.2 PLC system is specified to have the ability to communicate in both low voltage (LV) power lines, typically 100-240 VAC, as well as medium voltage (MV) power lines up to approximately 12 kV by crossing LV/MV transformers. This means that the receiver on the LV side must be able to detect the transmitted signal after it has been severely attenuated as a result of going through a MV/LV transformer. As the signal goes through the transformer it is expected to experience overall severe attenuation in its power level as well as frequency-dependent attenuation that attenuates higher frequencies. Both transmitter and receiver have mechanisms to compensate for this attenuation. The transmitter has the capability to adjust its overall signal level as well as shape its power spectrum based on tone map information provided by a target receiver, while the receiver has both an analog and digital automatic gain control (AGC) in order to achieve enough gain to compensate for the overall attenuation.

Figure 3:
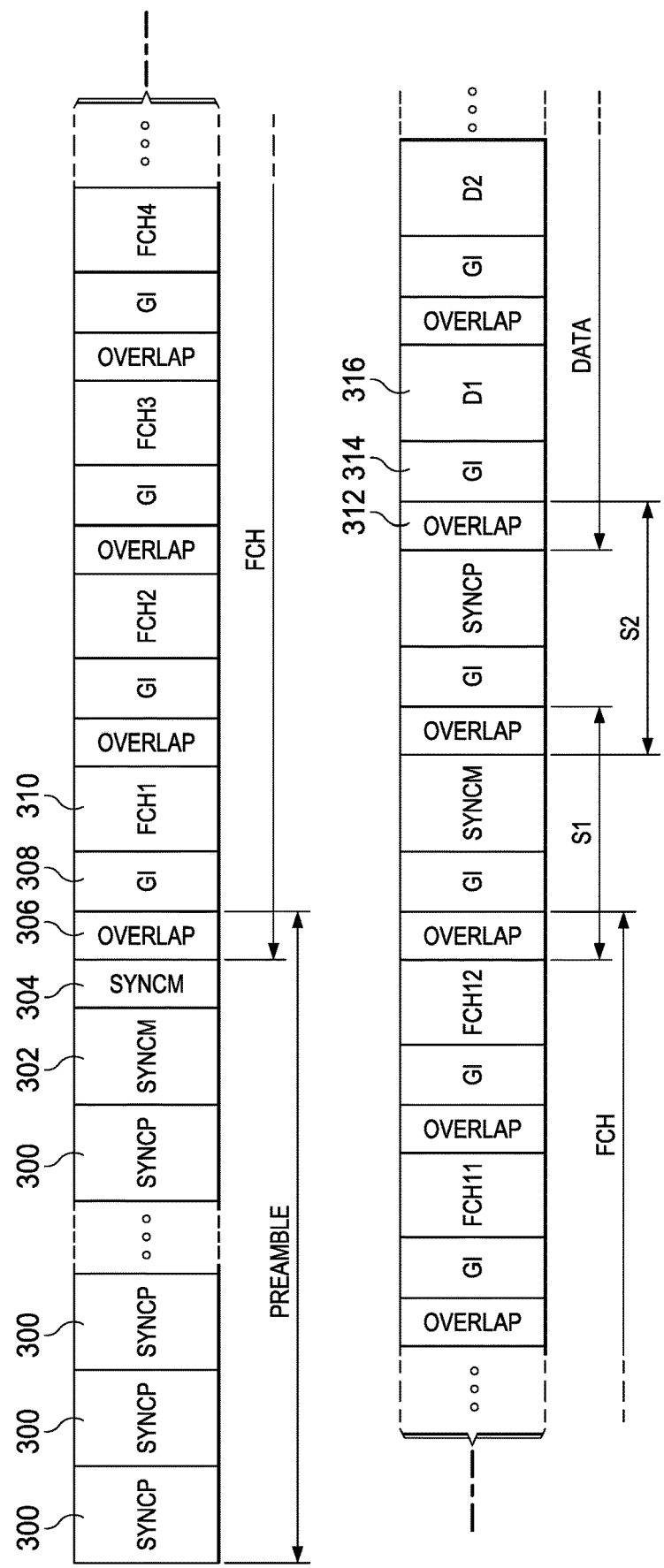
FIG. 3 is an IEEE 1901.2 (G3) compatible coherent frame structure of the present invention.

Turning now to FIG. 3, there is a coherent frame structure for communication between the network of FIG. 1 and the device of FIG. 2 according to the present invention. The frame includes a preamble, a frame control header (FCH) and payload data. The preamble includes synchronization symbols such as SYNCP 300 and SYNCM 302 and is terminated by a half SYNCM symbol 304, which is preferably a repetition of the first half of SYNCM 302. The preamble is separated from the FCH by an overlap region 306. The exemplary FCH includes 12 OFDM symbols, but this may vary with different band plans. The FCH is coherently modulated and contains information regarding the current frame such as the type of frame, the tone map index, and the length of the frame. Each FCH symbol is preceded by a respective guard interval (GI). For example, the FCH1 310 is preceded by respective GI 308, and each FCH symbol is separated by an overlap region. Symbols S1 and S2 are inserted between the FCH and the payload data (DATA). Symbol S2 is similar to SYNCP 300 except that it includes a cyclic prefix, GI, and overlap regions. Symbol S1 is an inverted version of S2 (−S2). The payload data follows symbols S1 and S2 and includes data in respective OFDM symbols. The first symbol, for example, includes overlap 312, GI 314, and data 316.

Figure 4:
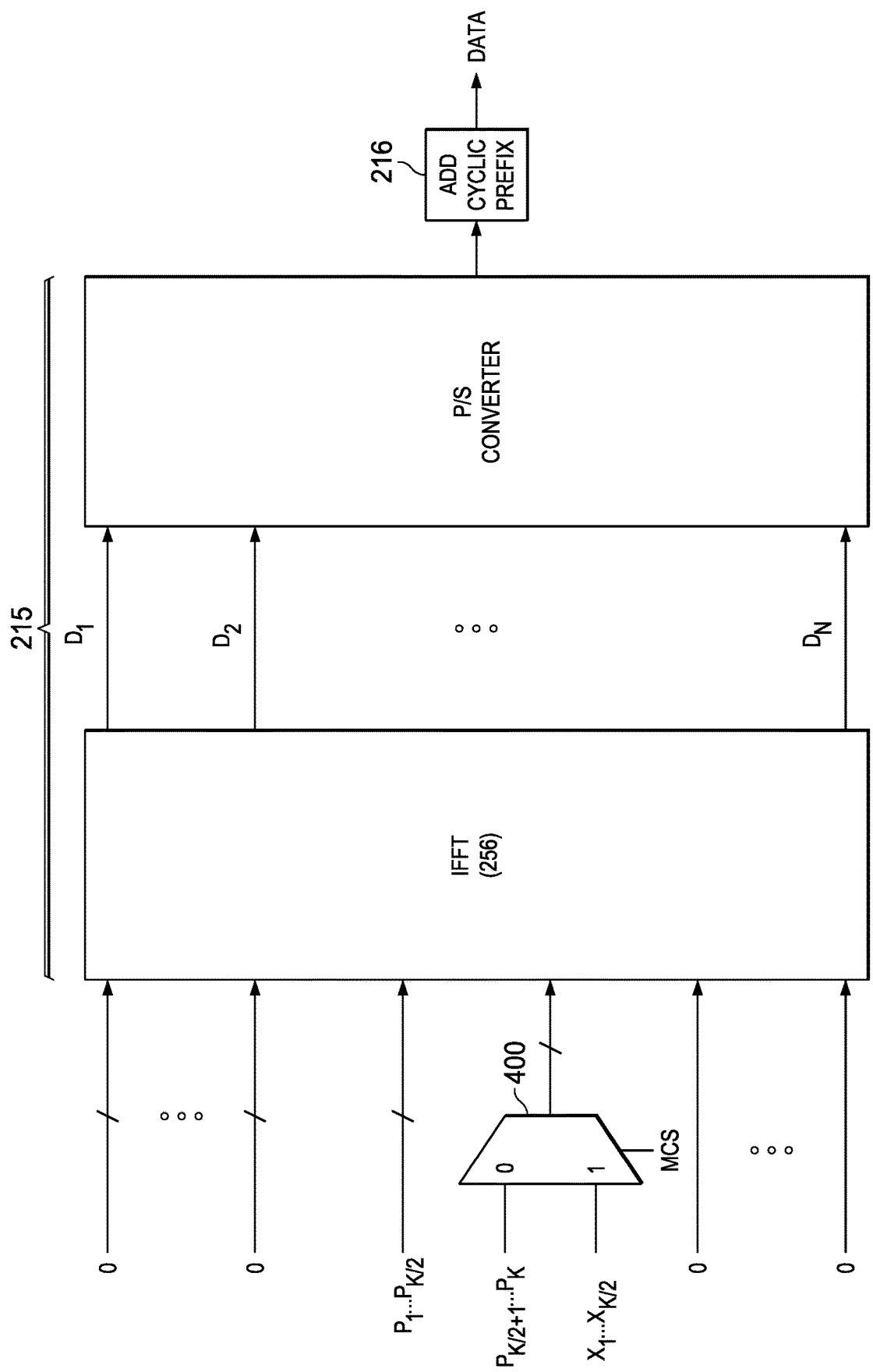
FIG. 4 is a diagram of a circuit for preamble symbol generation according to a first embodiment of the present invention.

Referring next to FIG. 4, there is a diagram of a circuit for preamble symbol generation according to a first embodiment of the present invention. The circuit includes IFFT and parallel-to-serial (P/S) converter 215 from FIG. 2. Cyclic prefix circuit 216 appends a cyclic prefix from the end of the P/S converter output to the beginning of the serial output to complete the OFDM symbol. As previously discussed, IEEE 1901.2 has specified 128 tones for FCC narrowband PLC. This requires a minimum of N=256 IFFT samples. In this exemplary embodiment, however, only K=72 of these tones are used, and the remaining 56 tones at the ends of the IFFT are unused and set to zero. Preamble tones 1-36 ($P_1$-$P_{K/2}$) are applied as inputs to the IFFT circuit. Multiplex circuit 400 is coupled to receive preamble tones 37-72 ($P_{K/2}$-$P_K$) and 36 data tones ($X_1$-$X_{K/2}$). Multiplex circuit 400 selectively applies the 36 preamble tones or the 36 data tones to the IFFT circuit in response to a modulation control scheme (MCS) signal.

Figure 5A:
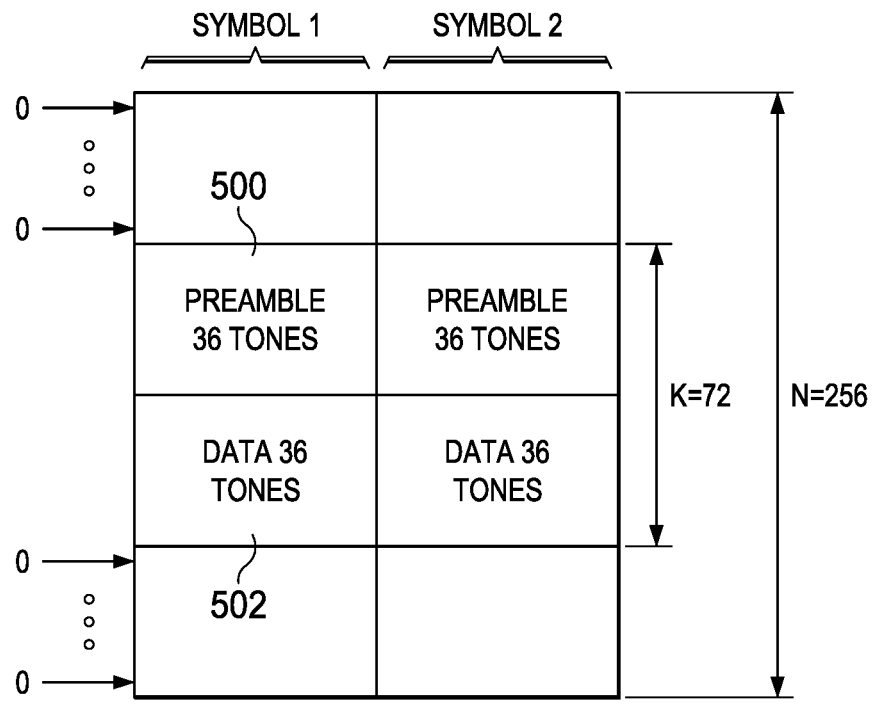
FIG. 5A is a diagram of sequential preamble symbols as generated by the circuit of FIG. 4, for a first logic level of a modulation control scheme (MCS) signal.
Figure 5B:
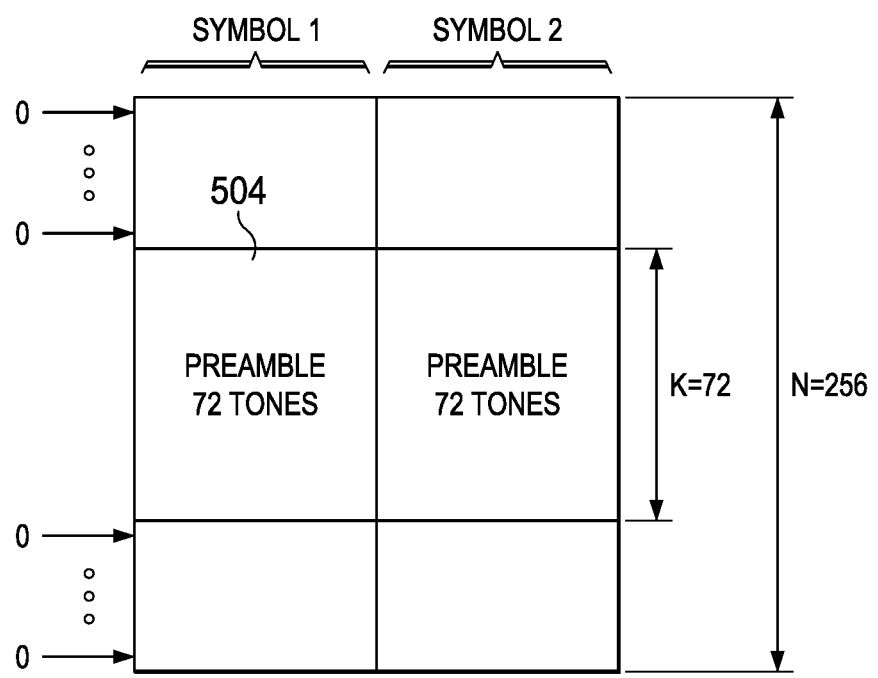
FIG. 5B is a diagram of sequential preamble symbols as generated by the circuit of FIG. 4, for a second logic level of the modulation control scheme (MCS) signal.

Operation of the circuit of FIG. 4 will now be described with reference to FIGS. 5A-5B. When the PLC signal-to-noise ratio (SNR) is good, a high data rate MCS may be selected for the frame of FIG. 3. In this case, 36 preamble tones are sufficient for synchronization detection at a receiver (FIG. 2). Thus, MCS has a high logic level and multiplex circuit 400 applies 36 data tones to the IFFT circuit. Sequential SYNCP symbols, therefore, have a structure as illustrated in FIG. 5A, where the vertical axis is subcarrier frequency and the horizontal axis is time. Each SYNCP OFDM symbol includes 36 preamble tones 500 and 36 data tones 502. The preamble tones are preferably contiguous within the OFDM symbol to provide a better correlation profile. This greatly increases data throughput when the PLC SNR is good. When the PLC signal-to-noise ratio (SNR) is compromised by noise, a lower data rate MCS may be selected for the frame of FIG. 3. In this case, 72 preamble tones may be required for synchronization detection. Thus, MCS has a low logic level and multiplex circuit 400 applies 36 additional preamble tones ($P_{K/2}$-$P_K$) to the IFFT circuit. Sequential SYNCP symbols, therefore, have a structure as illustrated in FIG. 5B. Each SYNCP OFDM symbol includes 72 preamble tones 504 and no data tones. In a first mode of operation, a receiver operates on a static allocation of data for each OFDM preamble symbol. This is preferably a default mode. In a second mode of operation, the receiver operates on a semi-persistent or adaptive allocation as determined by a received data frame. This mode is preferably adapted to the communication system SNR. This embodiment of the present invention advantageously increases data throughput when the PLC SNR is good and reverts to normal data throughput in a high noise environment.

Figure 6:
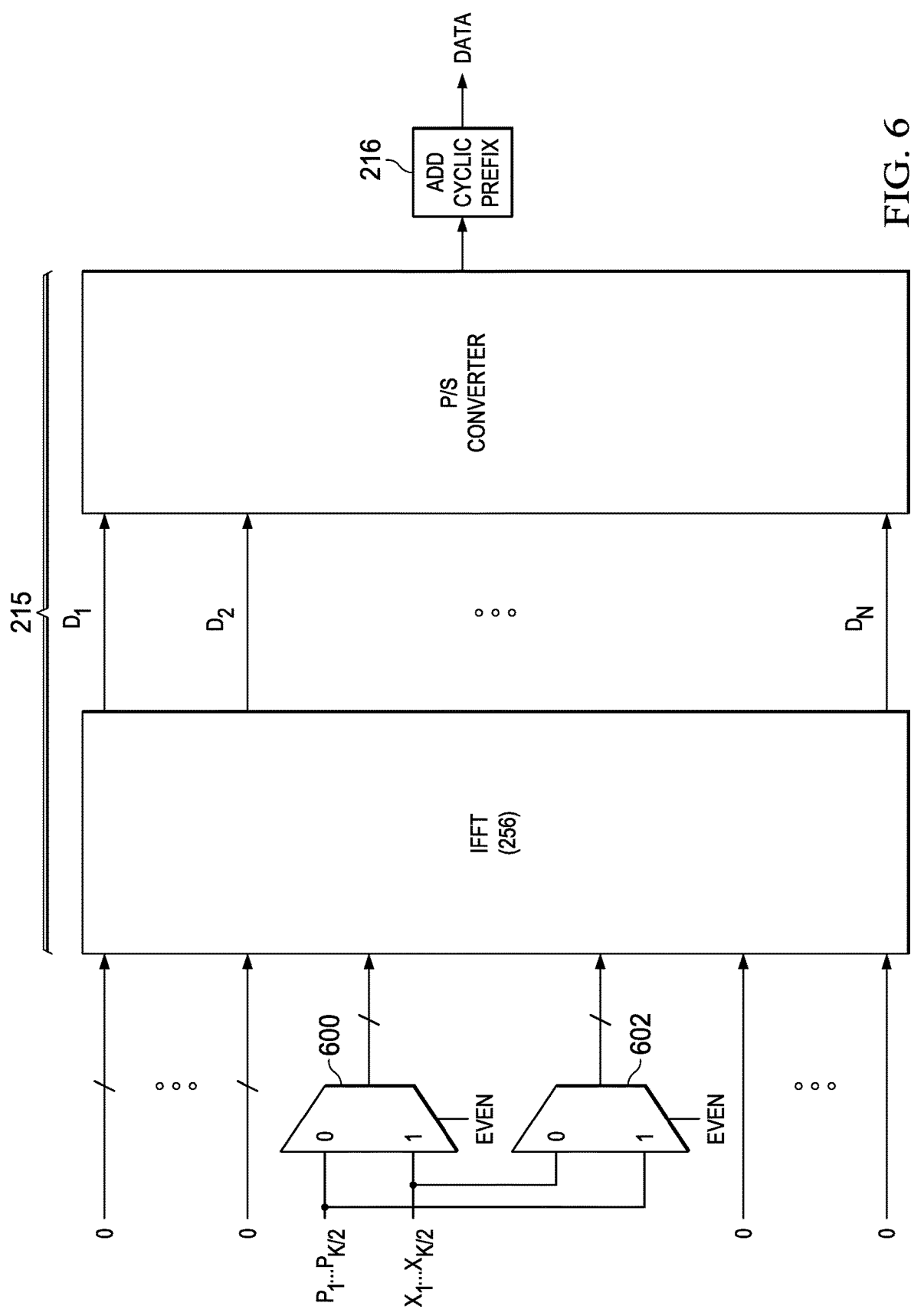
FIG. 6 is a diagram of a circuit for preamble symbol generation according to a second embodiment of the present invention.

Referring now to FIG. 6, there is a diagram of a circuit for preamble symbol generation according to a second embodiment of the present invention. The circuit includes IFFT and parallel-to-serial (P/S) converter 215 and cyclic prefix circuit 216. Multiplex circuit 600 selectively applies the 36 preamble tones ($P_1$-$P_{K/2}$) for odd-numbered symbols or 36 data tones ($X_1$-$X_{K/2}$) for even-numbered symbols in response to control signal EVEN. Likewise, multiplex circuit 602 selectively applies the 36 data tones for odd-numbered symbols or 36 preamble tones for even-numbered symbols in response to control signal EVEN.

Figure 7:
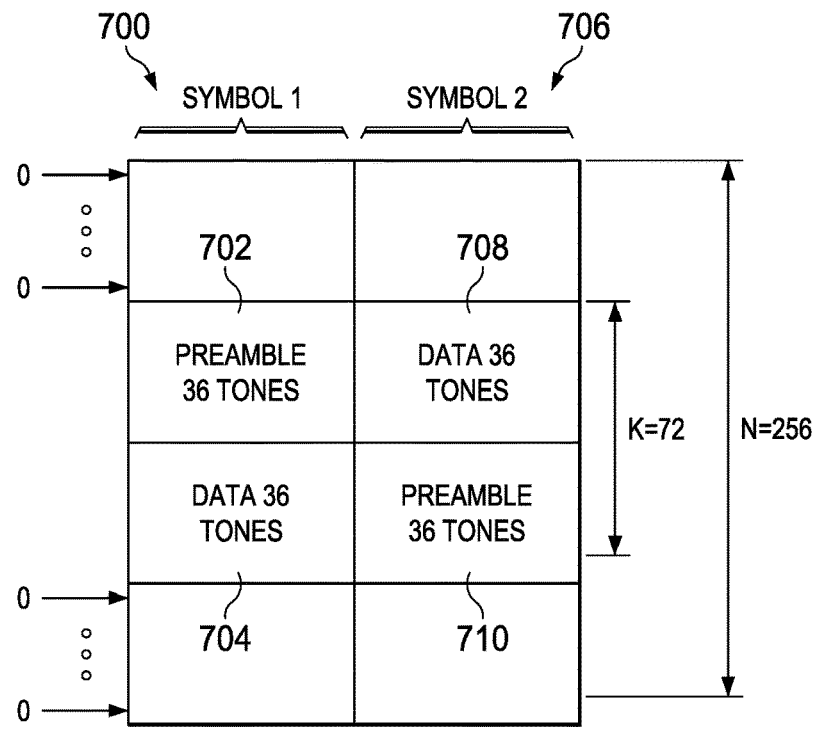
FIG. 7 is a diagram of sequential preamble symbols as generated by the circuit of FIG. 6, for respective odd and even preamble symbols.

Operation of the circuit of FIG. 6 will now be described with reference to FIG. 7. For odd-numbered symbol 700 (Symbol 1), control signal EVEN has a low logic state. Thus, multiplex circuit 600 applies preamble tones $P_1$-$P_{K/2}$ to IFFT circuit 215, and multiplex circuit 602 applies data tones $X_1$-$X_{K/2}$ to IFFT circuit 215. Symbol 700, therefore, includes 36 preamble tones 702 at the upper frequency range and 36 data tones 704 at the lower frequency range. For even-numbered symbol 706 (Symbol 2), control signal EVEN has a high logic state. Thus, multiplex circuit 600 applies data tones $X_1$-$X_{K/2}$ to IFFT circuit 215, and multiplex circuit 602 applies preamble tones $P_1$-$P_{K/2}$ to IFFT circuit 215. Symbol 706, therefore, includes 36 data tones 708 at the upper frequency range and 36 preamble tones 710 at the lower frequency range. In a first mode of operation, a receiver operates on a static allocation of alternating preamble and data subcarriers in each OFDM preamble symbol. This is preferably a default mode. In a second mode of operation, the receiver operates on a semi-persistent or adaptive allocation as determined by a received data frame. This mode is preferably adapted to the communication system SNR and desired throughput. This embodiment of the present invention advantageously improves frequency diversity gain by alternating preamble and data frequencies in adjacent OFDM symbols.

Figure 8:
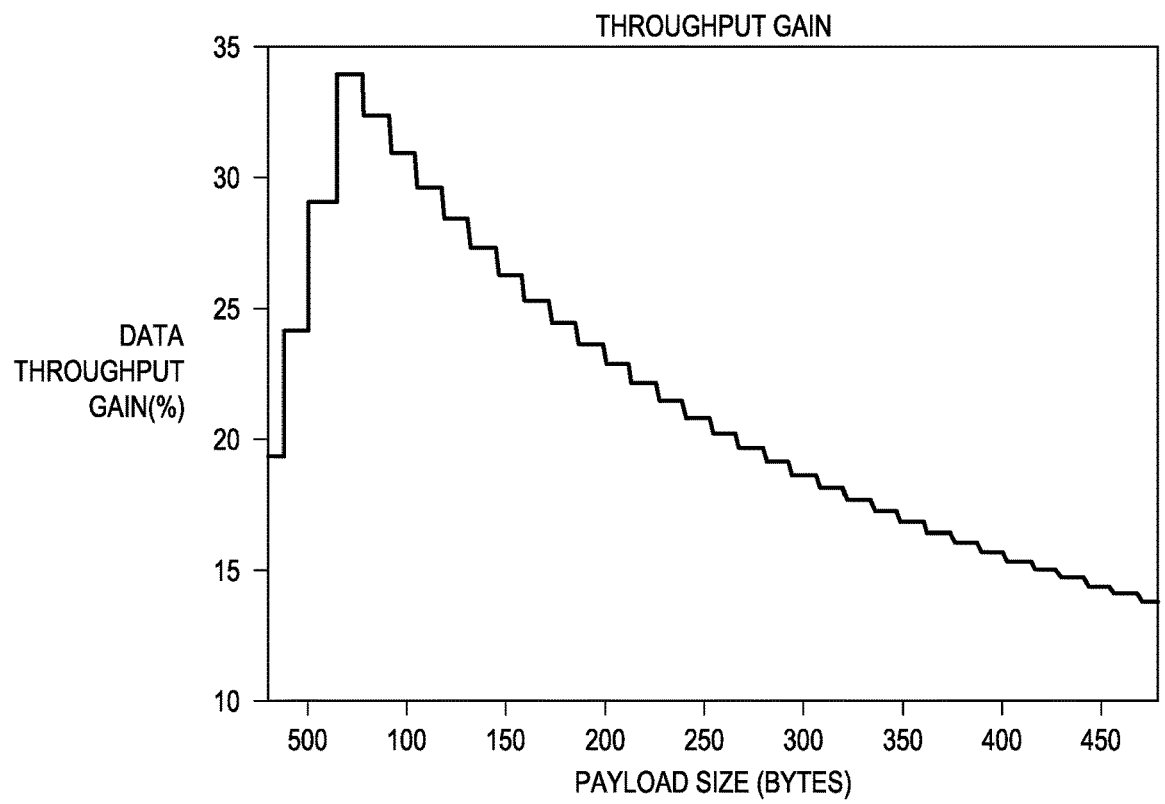
FIG. 8 is a diagram of throughput gain as a function of payload size according to the present invention.

Referring to FIG. 8, there is a diagram of throughput gain as a function of payload size according to the present invention. In the foregoing embodiment of the present invention, throughput gain increases from 19% to 34% as payload data increases from 30 to 70 bytes. Further increases in payload data size are accompanied by a gradual decrease in throughput gain. This is because additional data in the preamble becomes less significant as payload data (after FCH) in the frame increases. At 480 bytes of payload data, the throughput gain decreases to 14%.

Embodiments of the present invention may be readily adapted to other frame structures as one of ordinary skill in the art having access to the instant specification will understand. For other applications, the number of used preamble symbol tones K may be more or less than 72. Likewise, the IFFT samples may be more or less than 256. Although previous embodiments have specifically addressed addition of payload data to SYNCP symbols, payload data may also be added to SYNCM symbols or to frame symbols S1 and S2 of the FCH. Moreover, embodiments of FIGS. 4 and 6 may be combined to selectively include or omit data tones in response to a modulation control scheme, and the included data tones may alternate with preamble tones in alternating OFDM symbols.

Still further, while numerous examples have thus been provided, one skilled in the art should recognize that various modifications, substitutions, or alterations may be made to the described embodiments while still falling with the inventive scope as defined by the following claims. Furthermore, embodiments of the present invention may be implemented in software, hardware, or a combination of both. Other combinations will be readily apparent to one of ordinary skill in the art having access to the instant specification.

What is claimed is:

1. A method of operating a communications system having a communication line, the method comprising:
   detecting a signal-to-noise ratio of the communication line in response to a received data frame;
   selecting a high data rate modulation and coding scheme for communication in response to the detecting of the signal-to-noise ratio of the communication line;
   based on selecting the high data rate modulation and coding scheme, generating a first frame that includes a first preamble and a first data portion;
   transmitting, using the first frame, the first preamble and the first data portion concurrently;
   selecting a low data rate modulation and coding scheme for communication in response to the detecting of the signal-to-noise ratio of the communication line;
   based on selecting the low data rate modulation and coding scheme, generating a second frame that includes a second preamble; and
   transmitting, using the second frame, the second preamble without concurrently transmitting a second data portion.

2. The method of claim 1, wherein:
   the generating of the second frame allocates a set of N tones for transmitting the second preamble; and
   the generating of the first frame allocates the set of N tones for transmitting the first preamble and the first data portion.

3. The method of claim 2, wherein the set of N tones are contiguous orthogonal frequency division multiplex (OFDM) symbol tones.

4. The method of claim 2, wherein the generating of the first frame allocates a first set of N/2 tones for transmitting the first preamble and a second set of N/2 tones for transmitting the first data portion.

5. The method of claim 4 further comprising generating a third frame that includes a third preamble and a third data portion, wherein the generating of the third frame allocates the first set of N/2 tones for transmitting the third data portion and the second set of N/2 tones for transmitting the third preamble.

6. The method of claim 4 wherein tones of the first set of N/2 tones are higher in frequency than tones of the second set of N/2 tones.

7. The method of claim 1, wherein the communication line includes a power line.

8. The method of claim 1 further comprising:
   generating, by an inverse fast Fourier transform (IFFT), a first orthogonal frequency division multiplex (OFDM) symbol for the first frame;
   transmitting the first OFDM symbol over the communication line;
   generating, by the IFFT, a second OFDM symbol for the second frame; and
   transmitting the second OFDM symbol over the communication line.

9. The method of claim 8 further comprising:
   serializing the first OFDM symbol prior to the transmitting of the first OFDM symbol; and
   serializing the second OFDM symbol prior to the transmitting of the second OFDM symbol.

10. The method of claim 1:
    wherein the communications system includes an integer number X of frequency subcarriers, ranging from a low frequency subcarrier to a high frequency subcarrier; and
    wherein the first preamble and the first data portion are concurrently transmitted using an integer number K, less than X, of contiguous subcarrier frequencies between the low frequency subcarrier and the high frequency subcarrier.

11. A communication device for communicating in a communications system having a communication line and circuitry for detecting a signal-to-noise ratio of the communication line, the device comprising:
at least one processor;
a non-transitory computer readable storage medium storing instructions for execution by the at least one processor; wherein the instructions cause the at least one processor to:
select a first data rate for communication in response to the detected signal-to-noise ratio of the communication line being above a threshold;
based on selecting the first data rate, generate a first frame that includes a first preamble and a first data portion;
transmit, using the first frame, the first preamble and the first data portion concurrently;
select a second data rate for communication in response to the detected signal-to-noise ratio of the communication line being below the threshold;
based on selecting the second data rate, generate a second frame that includes a second preamble without a second data portion; and
transmitting, using the second frame, the second preamble.

12. The communication device of claim 11, wherein:
the instructions to generate the first frame include instructions to allocate a set of orthogonal frequency division multiplex (OFDM) symbol tones for transmitting the first preamble and the first data portion; and
the instructions to generate the second frame include instructions to allocate the set of OFDM symbol tones for transmitting the second preamble.

13. The communication device of claim 12, wherein the instructions to allocate the set of OFDM symbol tones for transmitting the first preamble and the first data portion allocate a first half of the set of OFDM symbol tones for transmitting the first preamble and a second half of the set of OFDM symbol tones for transmitting the first data portion.

14. The communication device of claim 13, wherein the instructions include further instructions to, based on selecting the first data rate, generate a third frame that includes a third preamble and a third data portion such that the first half of the set of OFDM symbol tones is allocated for transmitting the third data portion and the second half of the set of OFDM symbol tones is allocated for transmitting the third preamble.

15. The communication device of claim 11, wherein the communication line includes a power line.

16. The communication device of claim 11, wherein:
the instructions to transmit, using the first frame, the first preamble and the first data portion include instructions to:
generate, by an inverse fast Fourier transform (IFFT), a first orthogonal frequency division multiplex (OFDM) symbol for the first frame; and
transmit the first OFDM symbol over the communication line; and
the instructions to transmit, using the second frame, the second preamble include instructions to:
generate, by the IFFT, a second OFDM symbol for the second frame; and
transmit the second OFDM symbol over the communication line.

17. The communication device of claim 11:
wherein the communications system includes an integer number X of frequency subcarriers, ranging from a low frequency subcarrier to a high frequency subcarrier; and
wherein the first preamble and the first data portion are concurrently transmitted using an integer number K, less than X, of contiguous subcarrier frequencies between the low frequency subcarrier and the high frequency subcarrier.

18. A method of operating a communications system having a first communication line and a second communication line, the method comprising:
detecting a first signal-to-noise ratio of the first communication line in response to a received data frame;
detecting a second signal-to-noise ratio of the second communication line in response to the received data frame;
selecting a first data rate for communication in response to the detecting of the first signal-to-noise ratio of the first communication line exceeding a threshold;
based on selecting the first data rate, generating a first frame that includes a first preamble and a first data portion;
transmitting, using the first frame, the first preamble and the first data portion;
selecting a second data rate for communication in response to the detecting of the second signal-to-noise ratio of a second communication line being below the threshold;
based on selecting the second data rate, generating a second frame that includes a second preamble; and
transmitting, using the second frame, the second preamble without transmitting a second data portion.

19. The method of claim 18, wherein:
the generating of the second frame includes allocating a set of orthogonal frequency division multiplex (OFDM) tones for transmitting the second preamble; and
the generating of the first frame includes allocating the set of OFDM tones for transmitting the first preamble and the first data portion.

20. The method of claim 19, wherein the allocating of the set of OFDM tones for transmitting the first preamble and the first data portion allocates a first half of the set of OFDM tones for transmitting the first preamble, and a second half of the set of OFDM tones for transmitting the first data portion.

21. The method of claim 20 further comprising generating a third frame that includes a third preamble and a third data portion by allocating the first half of the set of OFDM tones for transmitting the third data portion, and a second half of the set of OFDM tones for transmitting the third preamble.

22. The method of claim 19, wherein the set of OFDM tones is contiguous.

23. The method of claim 18:
wherein the communications system includes an integer number X of frequency subcarriers, ranging from a low frequency subcarrier to a high frequency subcarrier; and
wherein the first preamble and the first data portion are concurrently transmitted using an integer number K, less than X, of contiguous subcarrier frequencies between the low frequency subcarrier and the high frequency subcarrier.

* * * * *